United States Patent
Bakker

(10) Patent No.: US 10,916,739 B2
(45) Date of Patent: Feb. 9, 2021

(54) WATER ACTIVATED BATTERY

(71) Applicant: Battery Research Technology Limited, Wan Chai (CN)

(72) Inventor: Niels Bakker, Central (CN)

(73) Assignee: Battery Research Technology Limited, Hong Kong (HK)

( * ) Notice: Subject to any disclaimer, the term of this patent is extended or adjusted under 35 U.S.C. 154(b) by 56 days.

(21) Appl. No.: 16/080,653

(22) PCT Filed: Mar. 1, 2017

(86) PCT No.: PCT/IB2017/000206
§ 371 (c)(1),
(2) Date: Aug. 28, 2018

(87) PCT Pub. No.: WO2017/153831
PCT Pub. Date: Sep. 14, 2017

(65) Prior Publication Data
US 2019/0027713 A1    Jan. 24, 2019

(30) Foreign Application Priority Data
Mar. 8, 2016 (HK) .................................. 16102664

(51) Int. Cl.
*H01M 2/02*   (2006.01)
*H01M 4/38*   (2006.01)
(Continued)

(52) U.S. Cl.
CPC .......... *H01M 2/0285* (2013.01); *H01M 4/38* (2013.01); *H01M 6/32* (2013.01); *H01M 10/0563* (2013.01); *H01M 2/0272* (2013.01)

(58) Field of Classification Search
CPC ............ H01M 6/30; H01M 6/32; H01M 6/36; H01M 6/38; H01M 2/0285; H01M 2/0272; H01M 10/0563
(Continued)

(56) References Cited

U.S. PATENT DOCUMENTS 3,376,166 A * 4/1968 Hruden ................. H01M 2/344
429/116

FOREIGN PATENT DOCUMENTS

CN    102340011 A    2/2012
CN    103326044 A    9/2013
(Continued)

OTHER PUBLICATIONS

EPO website (www.espacenet.com) machine translation of JP 2014-002873A (Year: 2014).*
(Continued)

*Primary Examiner* — Gregg Cantelmo
(74) *Attorney, Agent, or Firm* — Kolisch Hartwell, P.C.

(57) ABSTRACT

A battery includes a battery casing with a chamber that includes an electrolyte powder. The electrolyte powder surrounds a zinc material that is separated from the electrolyte powder by a permeable separator sheet. The battery also includes a conductive member with a first end in electrical communication with an anode terminal of the battery, and, a second end in electrical communication with the zinc material. A conductive layer is between an inner surface of the casing and the electrolyte powder and in electrical communication with the cathode terminal. There is also a liquid release mechanism that releases a liquid in the chamber to activate an ion flow between the electrolyte powder and the zinc material via the permeable separator sheet.

19 Claims, 8 Drawing Sheets

(51) Int. Cl.
*H01M 6/32* (2006.01)
*H01M 10/0563* (2010.01)

(58) Field of Classification Search
USPC .......................................... 429/118, 402, 406
See application file for complete search history.

(56) References Cited

FOREIGN PATENT DOCUMENTS

| | | | |
|---|---|---|---|
| JP | 2008204653 A | | 9/2008 |
| JP | 2014002873 A | | 1/2014 |
| JP | 2014107243 A | * | 6/2014 |
| WO | 2016004843 A1 | | 1/2016 |

OTHER PUBLICATIONS

EPO website (www.espacenet.com) machine translation of JP 2014-107243A (Year: 2014).*
Wu, Junxia, Authorized Officer, State Intellectual Property Office of the P.R. China, "International Search Report" in connection with related International Application No. PCT/IB2017/000206, dated Jun. 30, 2017, 4 pgs.
Wu, Junxia, Authorized Officer, State Intellectual Property Office of the P.R. China, "Written Opinion of the International Searching Authority" in connection with related International Application No. PCT/IB2017/000206, dated Jun. 30, 2017, 4 pgs.
European Patent Office, "Extended European Search Report" in connection with related European Patent Application No. 17762597.7, dated Sep. 25, 2019, 6 pgs.

* cited by examiner

WATER ACTIVATED BATTERY

TECHNICAL FIELD

The present invention relates to the field of batteries that are configured for activation upon introduction of a liquid into a chamber of the battery.

BACKGROUND OF THE INVENTION

Conventional off-the-shelf type AA and AAA batteries tend to deteriorate in performance over time during storage. This can pose a serious problem where the reliability in performance of the batteries is of critical importance—for instance, in an emergency situation where the batteries are required to power a flashlight, a radio, a mobile telephone, or other potentially life-saving electronic device.

In seeking to address this problem, water-activatable batteries have been developed which can be stored for a relatively long period of time in an inactive state (that is, where water has not yet been mixed with the electrolyte powder mixture within the battery to activate the electrolyte powder mixture) without substantial loss in performance of the battery when the battery is subsequently activated by addition of water.

However, existing water-activated batteries also exhibit certain drawbacks including that the structure and material composition of such batteries is still considered by some to be unduly complex and more costly than may be necessary to produce in volume. The structure of existing water-activated batteries is also such that parts of the batteries may be accidentally lost, thus rendering such batteries useless. This of course is undesirable particularly in an emergency situation.

SUMMARY OF THE INVENTION

The present invention seeks to alleviate at least one of the above-described problems.

The present invention may involve several broad forms. Embodiments of the present invention may include one or any combination of the different broad forms herein described.

In a first broad form, the present invention provides a battery including:

a battery casing defining a chamber therein;

an electrolyte powder disposed in the chamber, the electrolyte powder being configured to surround a zinc material that is separated from the electrolyte powder by a permeable separator sheet;

a conductive member having a first end configured for electrical communication with an anode terminal of the battery, and, a second end configured for electrical communication with the zinc material;

a conductive layer disposed between an inner surface of the casing and the electrolyte powder, the conductive layer being configured for electrical communication with a cathode terminal of the battery; and a liquid release mechanism configured for allowing release of a liquid in the chamber to activate an ion flow between the electrolyte powder and the zinc material via the permeable separator sheet whereby a potential difference is generated between the conductive layer and the conductive member in response to said activated ion flow.

Preferably, the electrolyte power may include a compressed electrolyte powder.

Preferably, the compressed electrolyte powder may include a substantially ring-shaped configuration having an outer peripheral surface and an inner peripheral surface defining a hollow core.

Preferably, the electrolyte powder may include electrolyte powder particles that have been ball milled.

Preferably, the zinc material may include at least one of a zinc powder and a zinc gel.

Preferably, the conductive layer may include a material that may be substantially non-reactive with the electrolyte. More preferably, the conductive layer may include a material that may be substantially non-reactive with a zinc chloride material.

Preferably, the conductive layer may include at least one of a graphite, carbon, silver, gold and platinum material.

Preferably, the conductive layer may include at least one of a foil sheet and a coating layer disposed on or substantially adjacent the inner surface of the peripheral wall of the battery.

Preferably, the casing may include at least one of Aluminium alloy, stainless steel and plastic.

Preferably, the present invention may include at least one channel, indent or rebate disposed within the chamber configured to allow passage of the liquid therethrough upon ingress of the liquid into the chamber wherein said passage of liquid is configured to effect ion flow between the electrolyte powder and the zinc material via the permeable separator sheet.

Preferably, the channel, indent or rebate may be configured to extend substantially along an elongate axis of the casing.

Preferably, the channel, indent or rebate may be formed in the electrolyte powder.

Preferably, the channel, indent or rebate may be disposed on the outer peripheral surface of the electrolyte powder and may extend substantially along an elongate axis of the electrolyte powder.

Preferably, the channel, indent or rebate may be disposed on the inner peripheral surface and may extend substantially along an elongate axis of the hollow core of the electrolyte powder.

Alternatively, the channel may be formed by the permeable separate sheet.

Typically, the liquid release mechanism may include an opening in the casing configured for allowing ingress of the liquid into the chamber of the battery, the ingress of said water into the casing being configured to activate ion flow between the electrolyte powder and the zinc material via the permeable separator sheet, whereby a potential difference is able to be generated between the conductive sheet and the conductive pin in response to said ion flow.

Also typically, the casing may include at least a first portion and a second portion that are movably attached to each other, the first and second portions being movable relative to each other between at least a first attached configuration whereby the opening is substantially blocked from allowing ingress of the liquid into the chamber of the casing via the opening, and, a second attached configuration whereby the opening is substantially unblocked so as to allow ingress of the liquid into the chamber of the casing so as to activate ion flow between the electrolyte powder and the zinc material via the permeable separator sheet. Also typically, a valve may be integrally formed in the casing, wherein said valve may be comprised by at least one of the first portion and the second portion of the casing.

Also typically, the casing may include at least a first portion and a second portion that are movable relative to each other between at least a first configuration whereby the first portion and second portion and attached and substantially block ingress of the liquid into the chamber of the casing via the opening, and, a second configuration whereby the first portion and second portion are detached so as to allow ingress of the liquid into the chamber of the casing via the opening so as to activate ion flow between the electrolyte powder and the zinc material via the permeable separator sheet.

Also typically, the liquid and/or electrolyte release mechanism may include an envelope housed within the chamber which releasably seals at least one of a liquid, an electrolyte or a combination thereof within the envelope, and the envelope maybe configured to be selectably unsealed so as to release the liquid, electrolyte and/or combination of both in the chamber. Also typically, the envelope may be able to be selectably unsealed by at least one of:

(a) a puncturing member configured for selectably puncturing the envelope;

(b) a tearing member configured for selectably tearing the envelope; and (c) a dissolving member configured for selectably dissolving the envelope.

The present invention may assist in providing a notable improvement over existing technologies in that the unique features of embodiments of the present invention may be readily and manufactured utilising manufacturing systems, equipment and processes that already exist for use of alkaline type batteries with minimal modification and minimal expenditure for effecting technical modification to such systems, equipment, and processes being required. Moreover, fewer processing steps are required for manufacturing of embodiments of the present invention than in manufacturing alkaline battery such that the overall cost of efficiency of manufacturing embodiment batteries may be notably faster and cheaper than manufacturing conventional alkaline type batteries using the same or similar manufacturing equipment and systems.

Furthermore, electrolyte in the form of compressed powder electrolyte rings that may be used in embodiments of the present invention tend to be relatively easily and efficiently slid in to or inserted into the chamber of the embodiment batteries in comparison to funneling of non-compressed electrolyte powders in other liquid-activatable type batteries and this manufacturing step is readily accommodated by existing systems, equipment and processing techniques applied to alkaline type batteries. Compressed electrolyte powder rings also tend to allow for a greater amount of electrolyte to be housed in the battery chamber which may bolster overall performance of such embodiment batteries.

BRIEF DESCRIPTION OF THE DRAWINGS

The present invention will become more fully understood from the following detailed description of a preferred but non-limiting embodiments thereof, described in connection with the accompanying drawings, wherein.

DETAILED DESCRIPTION OF THE EXEMPLARY EMBODIMENTS

Figure 1:
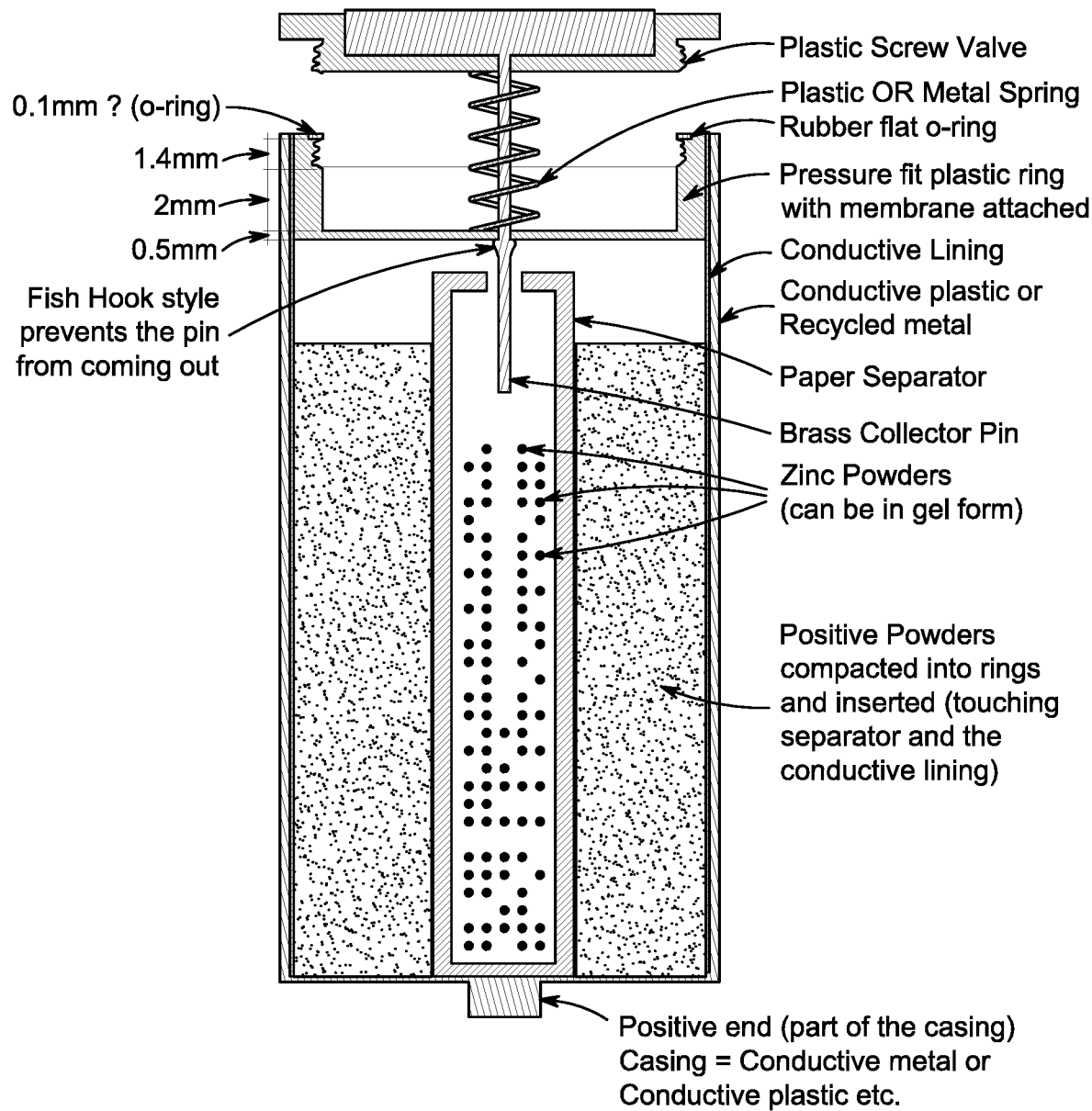
FIG. 1 depicts a side-cut-away view of an embodiment of the present invention with an integrally formed battery valve being arranged in an opened configuration to allow ingress of a liquid into the battery chamber.
Figure 2:
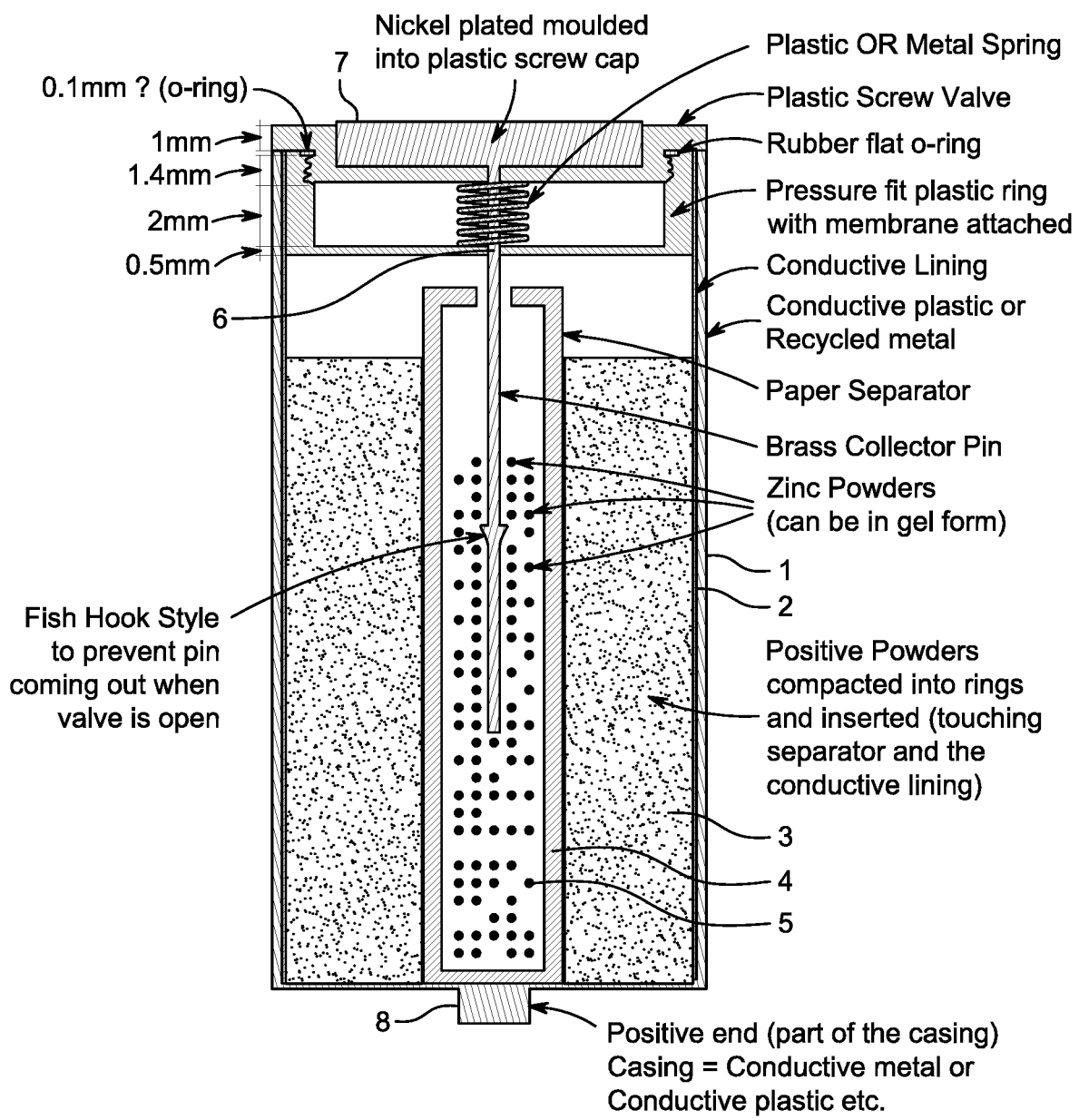
FIG. 2 depicts a side-cut-away view of an embodiment of the present invention with an integrally formed battery valve being arranged in an closed configuration to block ingress of a liquid into the battery chamber.
Figure 3:
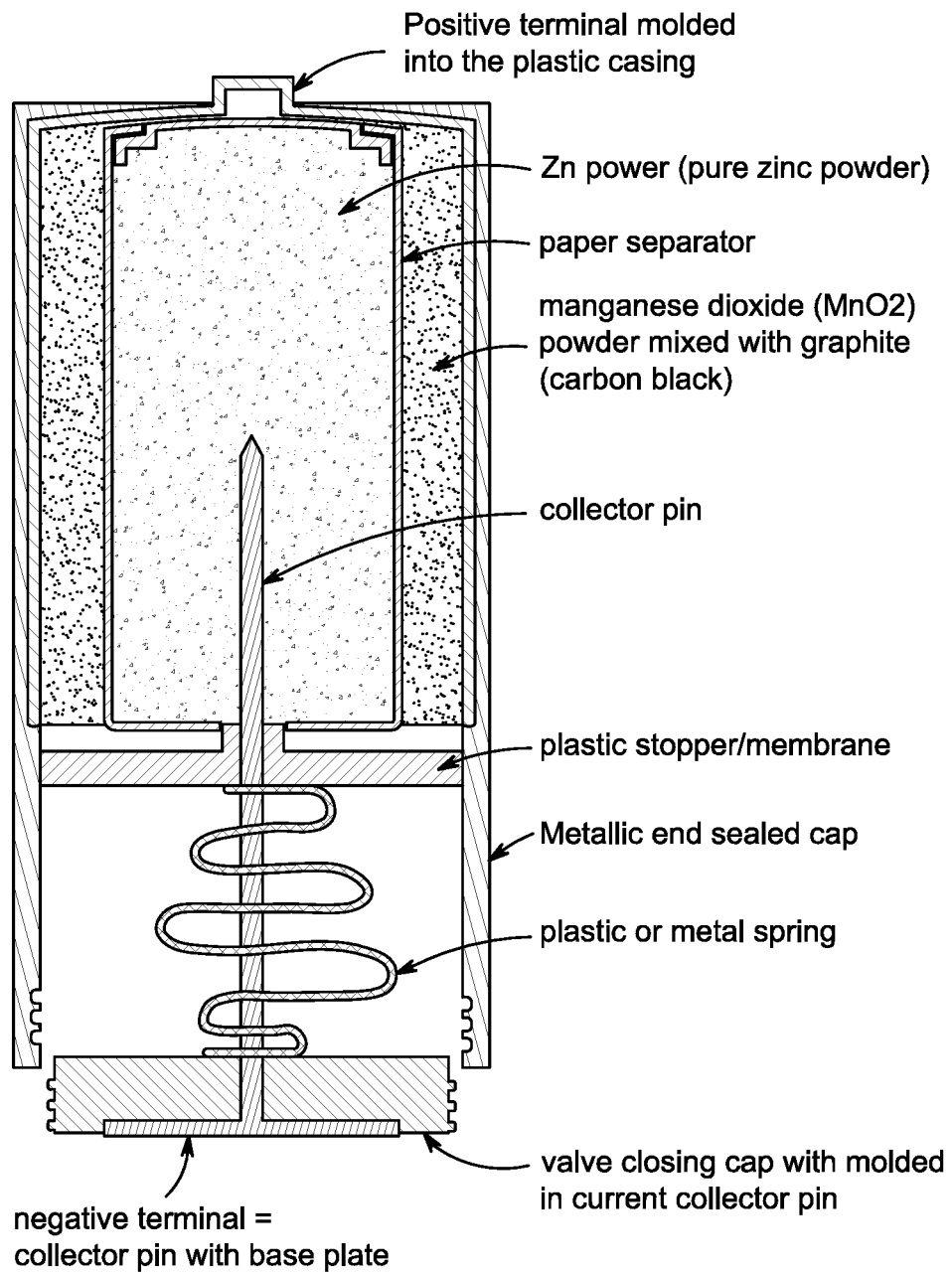
FIG. 3 depicts a further side-cut-away view of an embodiment of the present invention with an integrally formed battery valve being arranged in an opened configuration to allow ingress of a liquid into the battery chamber.
Figure 4:
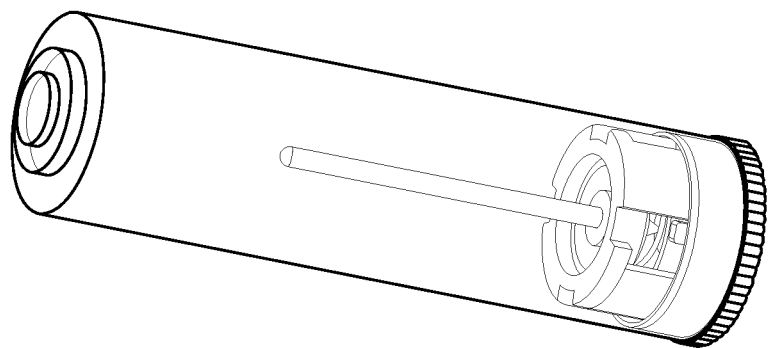
FIG. 4 shows a transparent perspective view of a further embodiment in which the collector pin can be seen extending inwardly of the battery chamber from an end of the battery.
Figure 5:
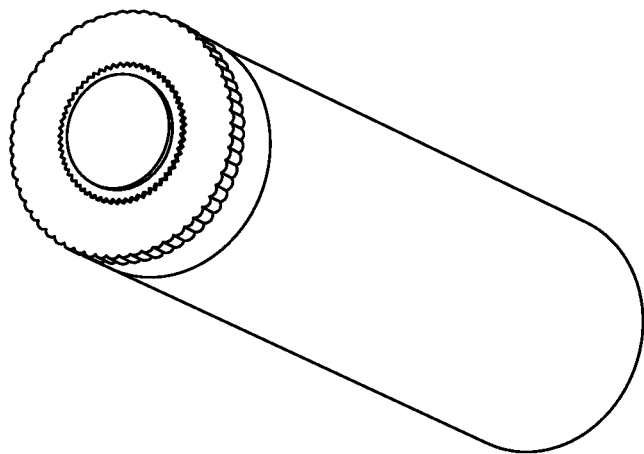
FIG. 5 shows a reverse perspective view of the embodiment of FIG. 4.
Figure 6:
FIG. 6 shows a side view of the embodiment of FIG. 4.
Figure 7:
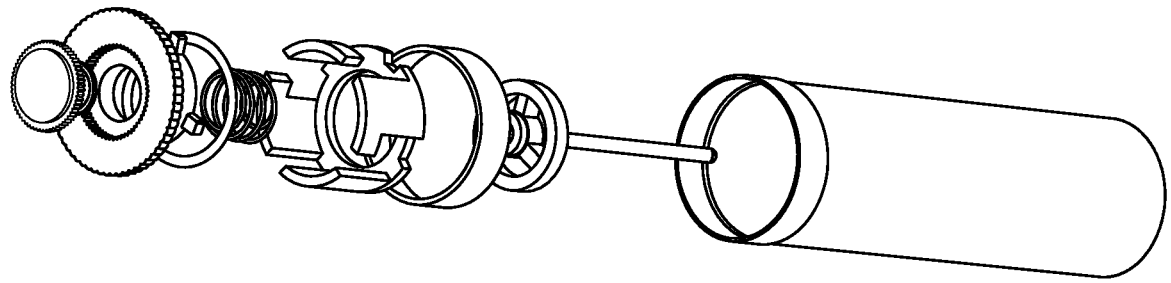
FIG. 7 shows an exploded perspective view of the embodiment of FIG. 4.
Figure 8:
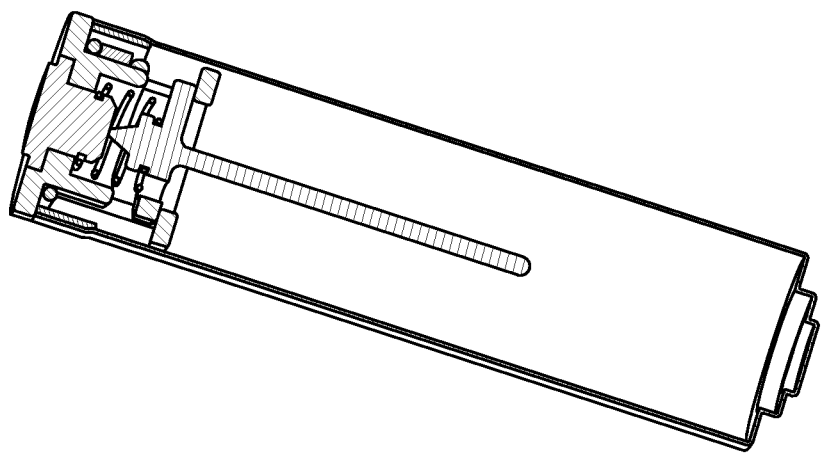
FIG. 8 shows a side cut-away view of the embodiment of FIG. 4.
Figure 9:
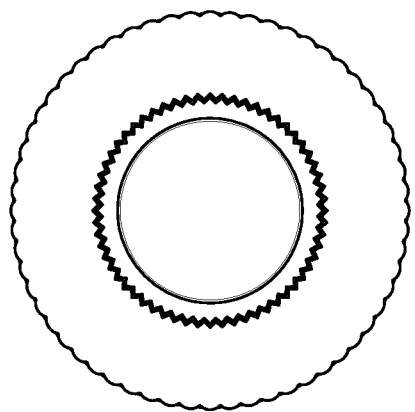
FIG. 9 shows an end view of the embodiment of FIG. 4.
Figure 10:
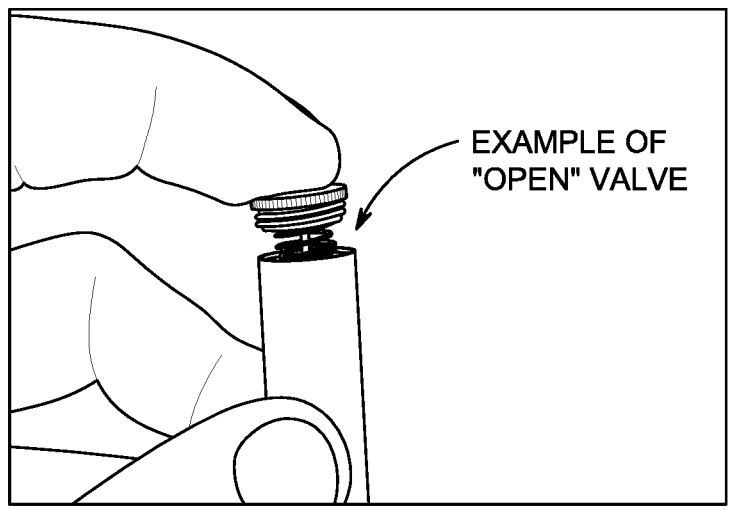
FIG. 10 depicts another embodiment which includes a spring-biased pop-up valve disposed at an end of the battery casing arranged in an opened configuration.
Figure 11:
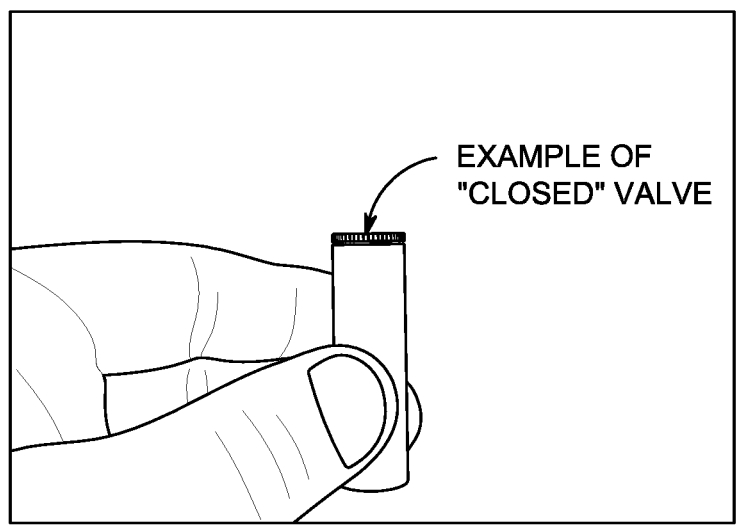
FIG. 11 depicts the embodiment of FIG. 10 with the valve arranged in a closed configuration.
Figure 12:
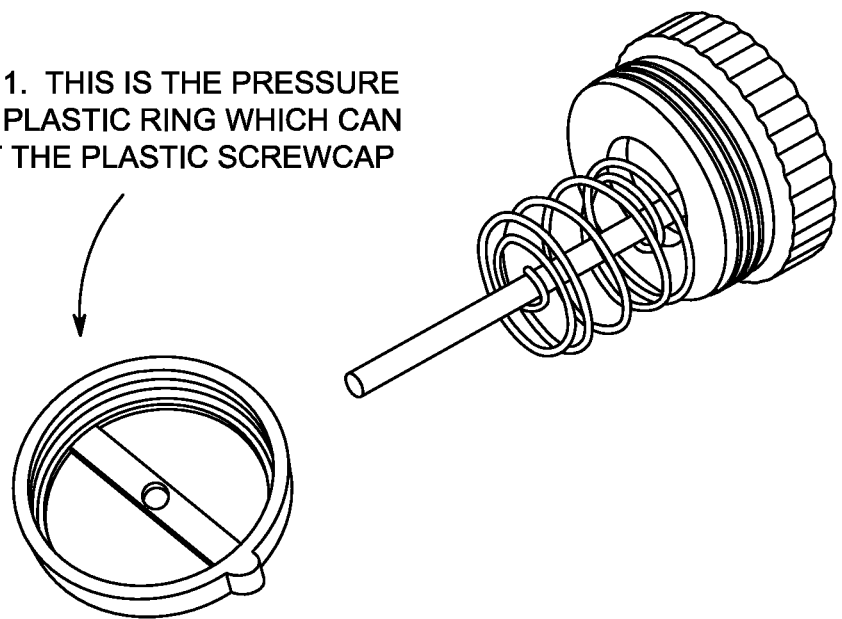
FIG. 12 depicts a valve for use in embodiments of the present invention in stand-alone form.
Figure 13:
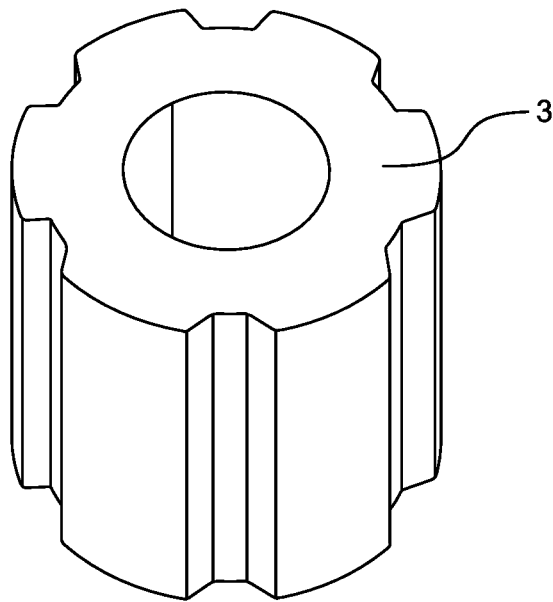
FIG. 13 shows a compressed electrolyte powder ring as used in certain embodiments of the present invention.
Figure 14:
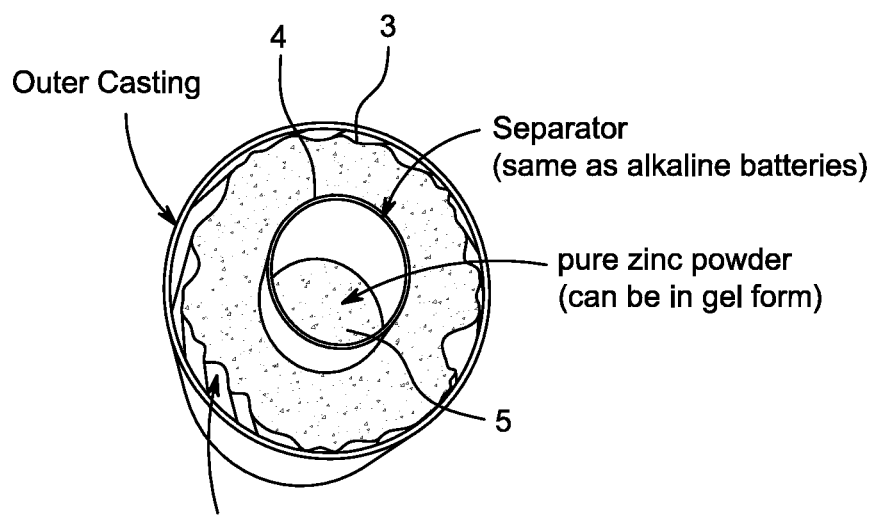
FIG. 14 depicts a top view of an embodiment battery with the end portion of the battery casing removed.

Exemplary embodiments of the present invention will now be described with referenced to the FIGS. 1 to 14. In these exemplary embodiments, a battery is provided which includes a battery casing (1) having a chamber with compressed electrolyte powder rings (3) housed therein. The compressed electrolyte powder rings (3) include hollow cores in which is positioned a zinc material (5) and a permeable separator sheet (4) which separates the compressed electrolyte powder from the zinc material (5). An anode terminal (7) is disposed at one end of the casing (1) as shown in FIGS. 1 and 2, in which the anode terminal (7) is in electrical communication with the zinc material via an electrically conductive brass collector pin extending into the zinc material (5) from the anode terminal (7). The anode terminal (7) is electrically isolated from the conductive layer (2) and battery casing (1) as the anode terminal (7) is surrounded by a non-conductive material such as non-conductive plastic material at the end of the casing as show in FIGS. 1 and 2. Batteries formed in accordance with embodiments of the present invention also include a liquid release mechanism which allows a liquid (such as water) to be selectably released in the chamber of the battery so as to activate ion flow between the compressed electrolyte powder mixture (3) and the zinc material (5) via the permeable separator (4) whereby a potential difference is generated between an anode terminal (7) and a cathode terminal (8) of the battery in response to the activated ion flow. Further details of implementation and operation of embodiments of the present invention will be described in greater detail below for illustrative purposes.

In a first embodiment, a battery is provided which has a battery casing which is substantially comparable to the shape and dimensions of a conventional AA type battery. In other embodiments, the battery casing may be configured to comply substantially with the shape and dimensions of other conventional battery types such as AAA-type batteries and -C type batteries. The following description of operation of certain embodiments of the present invention may be similarly implemented in these other battery types in accordance with the same broad principles of operation and construction.

The battery casing defines a cylindrical-shaped chamber having a barrel portion, a first end and a second end. One end includes an anode terminal of the battery and another end includes a cathode terminal of the battery. In this embodiment, the casing is formed from stainless steel however in alternate embodiments, the casing could be formed from Aluminium alloy, a conductive plastic (such as graphene) or any other suitable material in the functional context of the invention herein described.

A graphite layer (2) coats an inner surface of the chamber whereby the graphite layer is configured to be in electrical communication with the cathode terminal at the second end of the battery casing. The graphite layer is also configured to prevent the electrolyte powder in the chamber (which contains zinc chloride in this embodiment) from reacting with the stainless steel casing, and in doing so, assists in preserving the operational lifespan of the battery. The graphite layer may be painted on to the inner surface of the chamber or applied on to the inner surface by use of suitable particle deposition techniques. Alternatively, the graphite layer may take the form of a liner sheet which is also cylindrically shaped to snugly complement a contour of the inner surface such that the liner sheet may be inserted into the chamber and bonded to the inner surface with an adhesive or other means during manufacture. The thickness of the graphite layer should be formed as thin as possible so as to maximise the available space within the chamber for accommodation of electrolyte therein, whilst at the same time, not compromising its ability to communicate electrically with the cathode and to protect the casing from reacting with the electrolyte (which contain zinc chloride in these embodiments).

Other suitable materials may be used instead of a graphite layer to coat the inner surface of the battery chamber however the material should also be both conductive and also should not react with the electrolyte. Such other materials may for instance include silver, gold, platinum and carbon, however graphite is used in the embodiments due to it be in relatively inexpensive in comparison to the other listed materials. In yet alternate embodiments, pure graphite is able to be molded for use as the battery casing in which case a separate graphite layer does not need to be formed on the inner surface of the casing. However, the use of graphite in this manner is currently not cost-effective for commercial production of embodiment batteries at scale.

The first end of the casing includes an opening that is selectably adjustable between an opened configuration to allow ingress of a liquid into the chamber, and, a closed configuration whereby ingress of a liquid into the chamber via the opening is blocked. The opening is able to be realised in various implementations which will be discussed in further detail below.

The electrolyte inside of the battery chamber is provided in the form of a series of compressed electrolyte powder rings each having a cross-sectional shape profile configured to substantially complement a cross-sectional shape profile of the battery chamber so that the electrolyte powder rings may be snugly received within the chamber in stacked fashion. The electrolyte powder comprising the electrolyte powder rings are ball-milled to substantially uniform diameters of 4 µm before being formed into the rings using suitable powder compression techniques and processes. It is possible to form a single compressed electrolyte powder ring for use in the battery chamber, however in testing of embodiments, it was found that a single compressed electrolyte powder ring tended to be more susceptible to breakage during battery production. Accordingly, in these embodiments, three separate identically shaped and dimensioned compressed electrolyte powder rings are used each comprising approximately 3 gm of electrolyte to provide an overall amount of 9 gm of compressed electrolyte powder inside the battery chamber. It is possible in certain embodiments for non-compressed electrolyte powder to be used in the chamber, however, this does not optimise usage of the battery chamber and results in lower overall output power of the battery. The use of a non-compressed powder, whilst possible, would also result in slow manufacturing time compared to use of compressed powder rings which may be conveniently slid into the battery chamber during manufacture. In contrast it has been found through experiments that electrolyte powder may tend to be susceptible to clogging of a dispending nozzle used to dispense the powder into the battery chamber.

The electrolyte powder rings include circular peripheral surfaces and hollow circular cores which are aligned within the chamber to resemble a virtually continuous compressed electrolyte powder ring therein. A zinc material either in the form of a zinc powder or zinc gel is deposited into the hollow core of the compressed electrolyte powder rings during manufacture whereby the zinc material is separated from the compressed electrolyte powder by a permeable separator sheet disposed therebetween. In this embodiment, a zinc powder is used to demonstrate proof of concept, however, in large scale commercial manufacture of battery embodiments it may be more efficient to inject a zinc gel within the hollow core of the compressed electrolyte powder rings.

When ingress of liquid takes occurs via the opening in the battery casing, the liquid is absorbed by the permeable separator sheet such that ion flow is activated between the compressed electrolyte powder and the zinc material via the permeable separator sheet. As the liquid within the chamber further penetrates into the compressed electrolyte powder and the zinc material, the flow of ions will tend to increase. To improve the speed of absorption of the liquid by the permeable separator sheet and the speed of penetration of the liquid into the compressed electrolyte powder and zinc material, a series of channels are formed in the outer peripheral surfaces of the compressed electrolyte powder rings such that they extend substantially along an elongate axis of the casing and provide a pathway via which the liquid may flow within the casing. Six spaced-apart channels are formed in each of the compressed electrolyte powder rings with the six channels of each compressed electrolyte powder ring being in alignment within the chamber. In alternate embodiments, channels, rebates or indents may be formed in other areas of the electrolyte, or, may be formed in inner peripheral surfaces of the compressed electrolyte powder rings within the hollow cores of the compressed electrolyte powder rings. Yet alternatively, channels maybe formed in the permeable separator sheet, for instance by forming the permeable separator sheet with a corrugated configuration such that the corrugations extending along the elongate axis of the permeable separator sheet provide the channels of the liquid.

Embodiments of the present invention includes a liquid release mechanism which allows for a liquid such as water to be selectably released into the chamber by a user to activate the battery. The liquid release mechanism may be implemented in various ways. In one embodiment, the battery may include an opening disposed in the casing that is configured for selectably allowing ingress of the liquid into the chamber of the battery whereby the ingress of the liquid into the casing is configured to activate ion flow between the electrolyte powder and the zinc material via the permeable separator sheet, whereby a potential difference is able to be generated between the conductive sheet and the conductive pin in response to said ion flow.

In certain embodiments, the casing could include a first portion and a second portion that are movably attached to each other. The first and second portions are movable relative to each other between at least a first attached configuration such that the opening is substantially blocked from allowing ingress of the liquid into the chamber of the casing via the opening, and, a second attached configuration whereby the opening is substantially unblocked so as to allow ingress of the liquid into the chamber of the casing so as to activate ion flow between the electrolyte powder and the zinc material via the permeable separator sheet. In certain embodiment a valve is integrally formed in the casing which comprises the first and the second portions.

In embodiments of the present invention, the first and second portions could comprise any portions of the casing. The opening could also be disposed on the casing anywhere on the casing including at the first or second ends of the casing, or anywhere in the surface of the barrel portion of the casing between the first and second ends of the casing. By way of example, the first and second portion could comprise valve members of a valve that is integrally formed either the first or second end of the battery casing. The first and second portions of the casing forming the valve could be slidably movable and/or rotatably movable relative to each other between at least a first opened configuration to allow ingress of the liquid and a second closed configuration to not allow ingress of the liquid into the chamber. Advantageously, in these exemplary embodiments, as the first and second portions are not detached from one another at any stage when moved between the first and second configurations, the risk of inadvertently misplacing a part of the casing is alleviated.

In other embodiments, the first and second portions of the casing that are movable relative to each other between a first opened configuration to allow ingress of a liquid into the chamber, and, a second configuration to block ingress of the liquid into the chamber, may be entirely detachable when moved into the first opened configuration. For instance, a first end of the battery casing could for instance be configured such that it is entirely detached form the barrel portion of the casing and then re-attached when the opening in the first end of the battery is to be closed.

In embodiments of the present invention, the first and second portions of the casing that are movable relative to each other could be locked in to a relatively fixed position relative to each other (for instance, locked in to a second closed configuration) by use of a bayonet type locking mechanism between the first and second portion. Such a locking mechanism is relatively common, and easy to include in embodiment to lock first and second portions together quickly and easily.

In alternate embodiments, Also typically, the casing may include at least a first portion and a second portion that are movable relative to each other between at least a first configuration whereby the first potion and second portion and attached and substantially block ingress of the liquid into the chamber of the casing via the opening, and, a second configuration whereby the first portion and second portion are detached so as to allow ingress of the liquid into the chamber of the casing via the opening so as to activate ion flow between the electrolyte powder and the zinc material via the permeable separator sheet.

In yet alternate embodiments, the casing could be an entirely sealed chamber having a envelope housed inside the chamber. The envelope could be configured to contain a liquid, an electrolyte, or a combination of both within the envelope, and, a liquid release mechanism could be provided which would allow for the envelope to be selectably unsealed in order to release the liquid, the electrolyte and/or a combination of both within the chamber of the battery in order to activate ion flow between the electrolyte powder and the zinc material via the permeable separator sheet. The selectable unsealing of the envelope for instance be effected by a puncturing member configured for selectably puncturing the envelope, a tearing member configured for selectably tearing the envelope, or, a dissolving member configured for selectably dissolving the envelope. It may be the case in certain embodiments that twisting, sliding, rotating, elastic and/or inelastic deformation of the casing could control the puncturing member, tearing member or dissolving member to act upon the envelope within the chamber to unseal the envelope. The envelope may comprise of a material such as is used in "snap-to-activate" type luminescent "glow sticks" whereby deformation of the envelope or capsule containing separate substances allows for combining of the substances to trigger a chemical reaction. In certain embodiments, the electrolyte in the chamber of the battery may include Potassium Hydroxide and the liquid in the envelope may also contain Potassium Hydroxide.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed:

1. A battery including:
   a battery casing defining a chamber therein;
   an electrolyte powder disposed in the chamber, the electrolyte powder being configured to surround a zinc material that is separated from the electrolyte powder by a permeable separator sheet;
   a conductive member having a first end configured for electrical communication with an anode terminal of the battery, and, a second end configured for electrical communication with the zinc material;
   a conductive layer disposed between an inner surface of the casing and the electrolyte powder, the conductive layer being configured for electrical communication with a cathode terminal of the battery; and
   a liquid release mechanism configured for allowing release of a liquid in the chamber to activate an ion flow between the electrolyte powder and the zinc material via the permeable separator sheet whereby a potential difference is generated between the conductive layer and the conductive member in response to said activated ion flow.

2. A battery as claimed in claim 1 wherein the electrolyte power includes a compressed electrolyte powder.

3. A battery as claimed in claim 2 wherein the compressed electrolyte powder includes a substantially ring-shaped configuration having an outer peripheral surface and an inner peripheral surface defining a hollow core.

4. A battery as claimed in claim 1 wherein the electrolyte powder includes electrolyte powder particles that have been ball milled.

5. A battery as claimed in claim 1 wherein the zinc material includes at least one of a zinc powder and a zinc gel.

6. A battery as claimed in claim 1 wherein the conductive layer includes a material that is substantially non-reactive with the electrolyte.

7. A battery as claimed in claim 1 wherein the conductive layer includes at least one of a graphite, carbon, silver, gold and platinum material.

8. A battery as claimed in claim 1 wherein the conductive layer includes at least one of a foil sheet and a coating layer disposed on or substantially adjacent the inner surface of the peripheral wall of the battery.

9. A battery as claimed in claim 1 wherein the casing includes at least one of aluminum alloy, stainless steel and plastic.

10. A battery as claimed in claim 1 including at least one channel, indent or rebate disposed within the chamber configured to allow passage of the liquid therethrough upon ingress of the liquid into the chamber wherein said passage of liquid is configured to effect ion flow between the electrolyte powder and the zinc material via the permeable separator sheet.

11. A battery as claimed in claim 10 wherein the channel, indent or rebate is configured to extend substantially along an elongate axis of the casing.

12. A battery as claimed in claim 10 wherein the channel, indent or rebate is formed in the electrolyte powder.

13. A battery as claimed in claim 10 wherein the channel, indent or rebate is disposed on the outer peripheral surface of the electrolyte powder and extends substantially along an elongate axis of the electrolyte powder.

14. A battery as claimed in claim 10 wherein the channel, indent or rebate is disposed on the inner peripheral surface and extends substantially along an elongate axis of the hollow core of the electrolyte powder.

15. A battery as claimed in claim 10 wherein the channel is formed by the permeable separate sheet.

16. A battery as claimed in claim 1 wherein the liquid release mechanism includes an opening in the casing configured for allowing ingress of the liquid into the chamber of the battery, the ingress of said water into the casing being configured to activate ion flow between the electrolyte powder and the zinc material via the permeable separator sheet, whereby a potential difference is able to be generated between the conductive sheet and the conductive pin in response to said ion flow.

17. A battery as claimed in claim 1 wherein the casing includes at least a first portion and a second portion that are movably attached to each other, the first and second portions being movable relative to each other between at least a first attached configuration whereby the opening is substantially blocked from allowing ingress of the liquid into the chamber of the casing via the opening, and, a second attached configuration whereby the opening is substantially unblocked so as to allow ingress of the liquid into the chamber of the casing so as to activate ion flow between the electrolyte powder and the zinc material via the permeable separator sheet.

18. A battery as claimed in claim 17 including a valve integrally formed in the casing, wherein said valve includes at least one of the first portion and the second portion of the casing.

19. A battery as claimed in claim 1 wherein the casing includes at least a first portion and a second portion that are movable relative to each other between at least a first configuration whereby the first potion and second portion and attached and substantially block ingress of the liquid into the chamber of the casing via the opening, and, a second configuration whereby the first portion and second portion are detached so as to allow ingress of the liquid into the chamber of the casing via the opening so as to activate ion flow between the electrolyte powder and the zinc material via the permeable separator sheet.

* * * * *